United States Patent
Wang

(10) Patent No.: US 8,116,738 B2
(45) Date of Patent: Feb. 14, 2012

(54) METHOD AND SYSTEM FOR MANAGING INFORMATION WITHIN A NETWORK

(75) Inventor: Yeqing Wang, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 1338 days.

(21) Appl. No.: 11/623,783

(22) Filed: Jan. 17, 2007

(65) Prior Publication Data

US 2011/0096720 A1    Apr. 28, 2011

(51) Int. Cl.
*H04M 1/725* (2006.01)
(52) U.S. Cl. .................. 455/412.1; 370/428; 455/403
(58) Field of Classification Search .................. None
See application file for complete search history.

(56) References Cited

U.S. PATENT DOCUMENTS

| | | | |
|---|---|---|---|
| 2003/0172303 A1* | 9/2003 | Adusumilli | 713/201 |
| 2010/0191592 A1* | 7/2010 | Light et al. | 705/14.23 |
| 2010/0279719 A1* | 11/2010 | Salmi | 455/466 |
| 2011/0019804 A1* | 1/2011 | Kovales et al. | 379/87 |
| 2011/0026436 A1* | 2/2011 | Karaoguz et al. | 370/254 |
| 2011/0051740 A1* | 3/2011 | Peshkin et al. | 370/401 |

\* cited by examiner

*Primary Examiner* — Ajit Patel
(74) *Attorney, Agent, or Firm* — Stewart M. Wiener

(57) ABSTRACT

A method and system for managing information using a gateway (130) is disclosed. The network includes a gateway (130) and at least one wireless device (110, 115). The method includes (304) downloading information from a predefined source to a gateway via a broadband link in response to a real time request received from a wireless device. Further, the method includes (306) storing the information within the gateway. Moreover, the method includes (308) transmitting the stored information from the gateway to the wireless device.

12 Claims, 5 Drawing Sheets

METHOD AND SYSTEM FOR MANAGING INFORMATION WITHIN A NETWORK

FIELD OF INVENTION

The present invention relates to networks, and more specifically, to a method and system for managing information within a network.

BACKGROUND OF THE INVENTION

The need for information is becoming increasingly popular. Some examples of such information include traffic updates, weather forecasts, score updates, stock updates, and news headlines. For example, traffic updates can include information related to the speed of the traffic, diversions, traffic jams, or any other type of reports related to traffic that can be helpful for a user, to avoid traffic congestion. With such traffic updates, the user can, for instance, plan his/her route to office before leaving his/her house. Similarly, some users may need weather forecast reports for a weekend, so that they can plan the weekend accordingly. Information on stocks helps users to anticipate a rise or fall in the stock market. News headlines keep a user updated with current events. Requests for such information can be sent by users according to their needs.

There exist one or more methods, by using which a user can make a request for information. In one such method, the user of an electronic device such as a mobile phone can send a request for information to a service center by using a mobile communication network. The request can be in the form of a message or a phone call. The service center receives the request for the information and sends the required information to the mobile phone. The required information can be provided through the mobile communication network by using a point-to-point mobile phone link. This method utilizes mobile communication resources such as mobile communication network bandwidth. These resources are limited and are expensive. Consequently, the communication cost involved in receiving the information through the mobile communication network is high.

In another method, a user can log on to a website to access information by using a mobile phone. The user can browse through the website, using the mobile phone to make a request for information. For example, the user can log on to a weather department website and view a weather forecast. However, the process of logging on to websites to get the information can be cumbersome. Further, the user cannot be sure of receiving the information as required by him/her. For example, if the user needs a weather forecast every morning, he/she will have to log on to the weather department website every morning. Moreover, this method utilizes mobile communication resources such as a mobile communication network bandwidth, which are limited and expensive.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
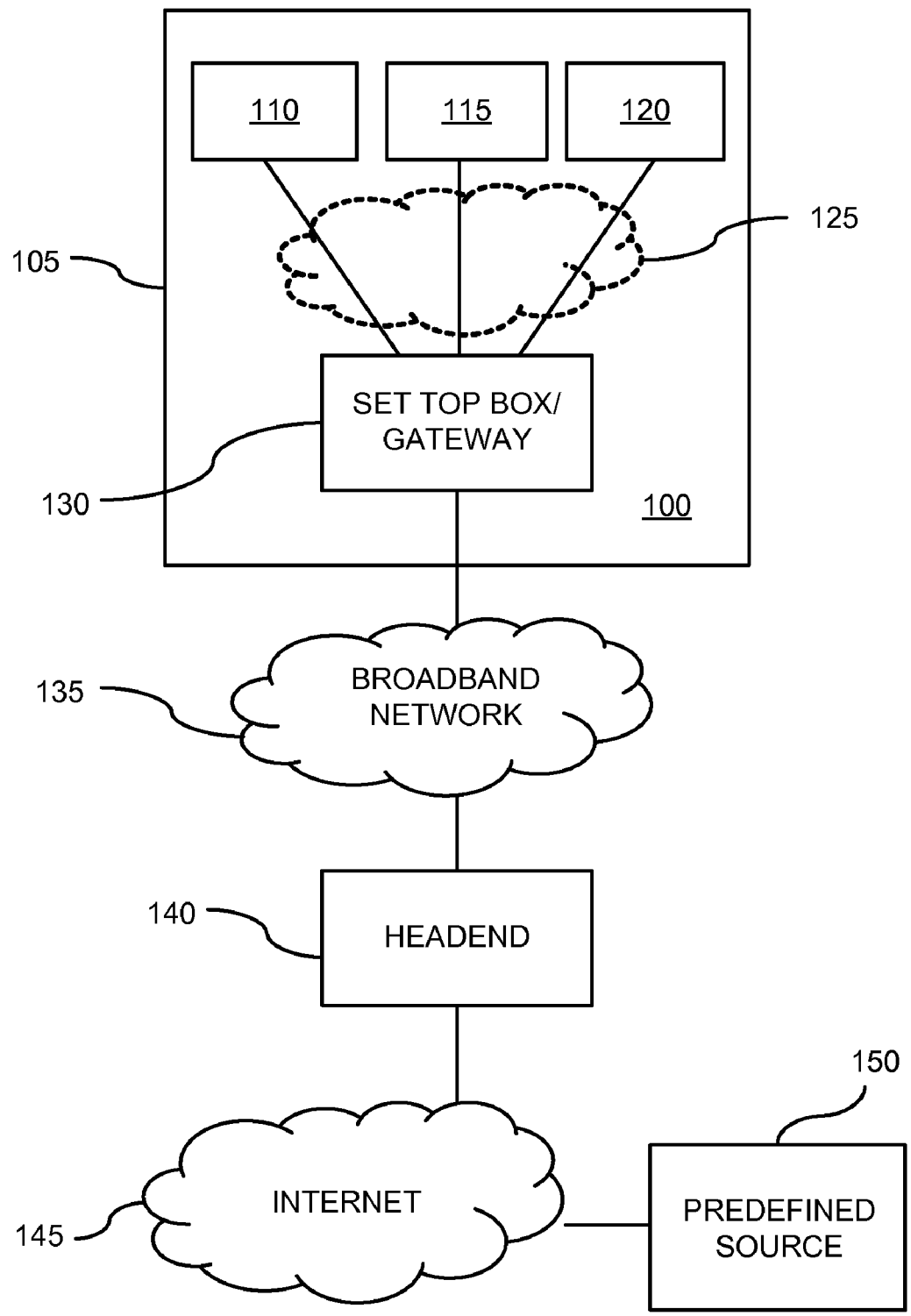
FIG. 1 illustrates an exemplary network where some embodiments of the present invention can be practiced.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method and system for communicating within a wireless communication network, in accordance with various embodiments of the present invention, it should be observed that the present invention resides primarily in combinations of method steps related to the method and system for managing information within a network. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms "comprises," "comprising," or any other variation thereof, are intended to cover a non-exclusive inclusion, such that a process, method, article or apparatus that comprises a list of elements does not include only those elements but may include other elements not expressly listed or inherent to such a process, method, article or apparatus. An element proceeded by "comprises . . . a" does not, without more constraints, preclude the existence of additional identical elements in the process, method, article or apparatus that comprises the element. The term "another," as used in this document, is defined as at least a second or more. The term "includes", as used herein, is defined as comprising.

In one embodiment, a method, apparatus, and computer-readable medium for managing information using a gateway is provided. A gateway and at least one wireless device is provided. Information from a pre-defined source is downloaded at a gateway via a broadband link in response to a real-time request received from a wireless device. The downloaded information is stored within the gateway. The stored information is transmitted from the gateway to the wireless device.

In another embodiment, a method, apparatus, and computer-readable medium for managing information using a gateway is provided. A gateway and at least one wireless device is provided. A request to download information according to a predefined schedule is received from a wireless device. The information is downloaded from a pre-defined source via a broadband link in accordance with the predefined schedule. The received information is stored within the gateway. The stored information is then transmitted to the wireless device.

In another embodiment, a method, apparatus, and computer-readable medium for managing information using a gateway is provided. Information from a predefined source is requested using a gateway connected to a broadband network instead of a mobile network. The information is then received from the gateway.

FIG. 1 illustrates an exemplary system 100 where some embodiments of the present invention can be practiced. The system 100 comprises a gateway 130, one or more wireless devices 110, 115, a headend, and a predefined source.

In one embodiment, gateway 130 receives a request from wireless device 110, 115 to download information from pre-defined source 150 and communicates the request to headend 140 via broadband link 135. Headend 140 communicates the request for information to predefined source 150 via the internet 145. Predefined source 150 sends the information to headend 140 via the internet 145. Headend 140 sends the information to gateway 130 via broadband network 135.

Using system 100, a wireless device 110, 115, e.g., a mobile telephone may download information using the broadband network instead of the mobile telephone network. Downloading information via a broadband link instead of the mobile telephone network provides cost and download speed benefits to a user of the electronic device.

In one embodiment, wireless devices 110, 115 may be connected to gateway 130 via a wired connection. In another embodiment, wireless devices 110, 115 may be connected to gateway 130 via a wireless connection 125. Examples of the wireless connection 125 may include, but are not limited to, a short distance protocol network, a Bluetooth™ link, an infrared link, a Wireless Fidelity Network (Wi-Fi), and an IEEE 802.11 link.

Examples of the gateway 130 may include, but are not limited to a cable network set-top box, an Integrated Receiver/Decoder (IRD), a Digibox, a Peripheral Interface Adapter (PIA), and the like. Examples of the one or more wireless devices 110, 115 include, but are not limited to, a mobile telephone, a laptop, a Personal Digital Assistant (PDA), a smart phone, and a pager, and the like.

System 100 may also include electronic device 120. In one embodiment, gateway 130 is connected to electronic device 120. Gateway 130 receives broadcasted signals from headend 140 via broadband link 135. The broadcasted signals are decoded by gateway 130 and provided to electronic device 120. Examples of the electronic device 110 include, but are not limited to, a television set, a computer, a projector, and the like.

Gateway 130 may receive information from pre-defined source 150. In one embodiment, the gateway 130 converts the format of the received information to one that is compatible with wireless device 110, 115. Gateway 130 then transmits the received information to the wireless device 110, 115, via a wired or wireless connection.

Figure 2:
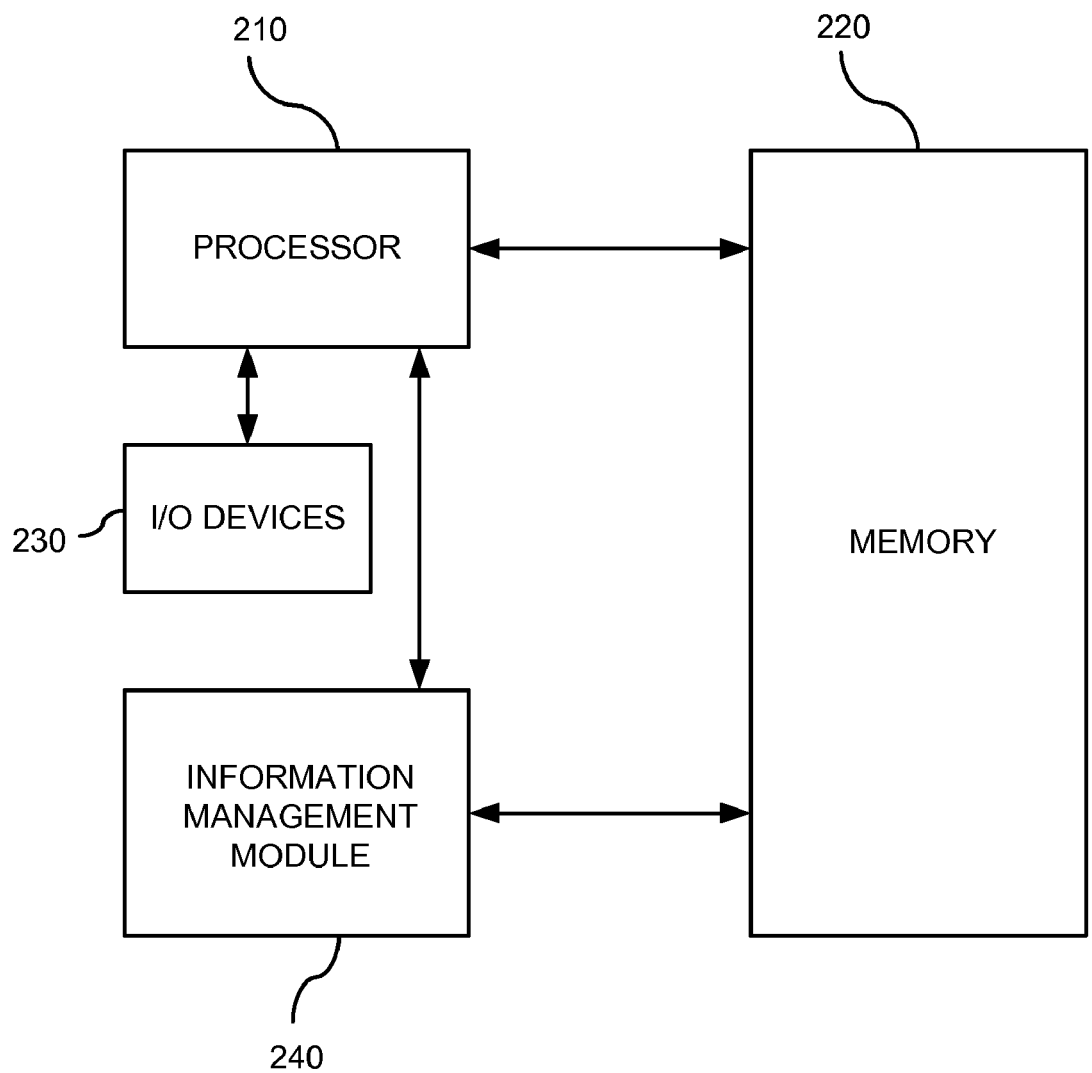
FIG. 2 illustrates a block diagram of an information management device or system, in accordance with one embodiment of the present invention.

FIG. 2 illustrates a block diagram of an information management device or system 200 of the present invention. Specifically, the system can be employed to provide information from predefined source 150 to wireless device 110, 115 via broadband network 135. In one embodiment, the information management device or system 200 is implemented using a general purpose computer or any other hardware equivalents.

Thus, information management device or system 200 comprises a processor (CPU) 210, a memory 220, e.g., random access memory (RAM) and/or read only memory (ROM), information management module 240, and various input/output devices 230, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that information management module 240 can be implemented as one or more physical devices that are coupled to the CPU 210 through a communication channel. Alternatively, the information management module 240 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 220 of the computer. As such, the information management module 240 (including associated data structures) of the present invention can be stored on a computer readable medium, e.g., RAM memory, magnetic or optical drive or diskette and the like.

Figure 3:
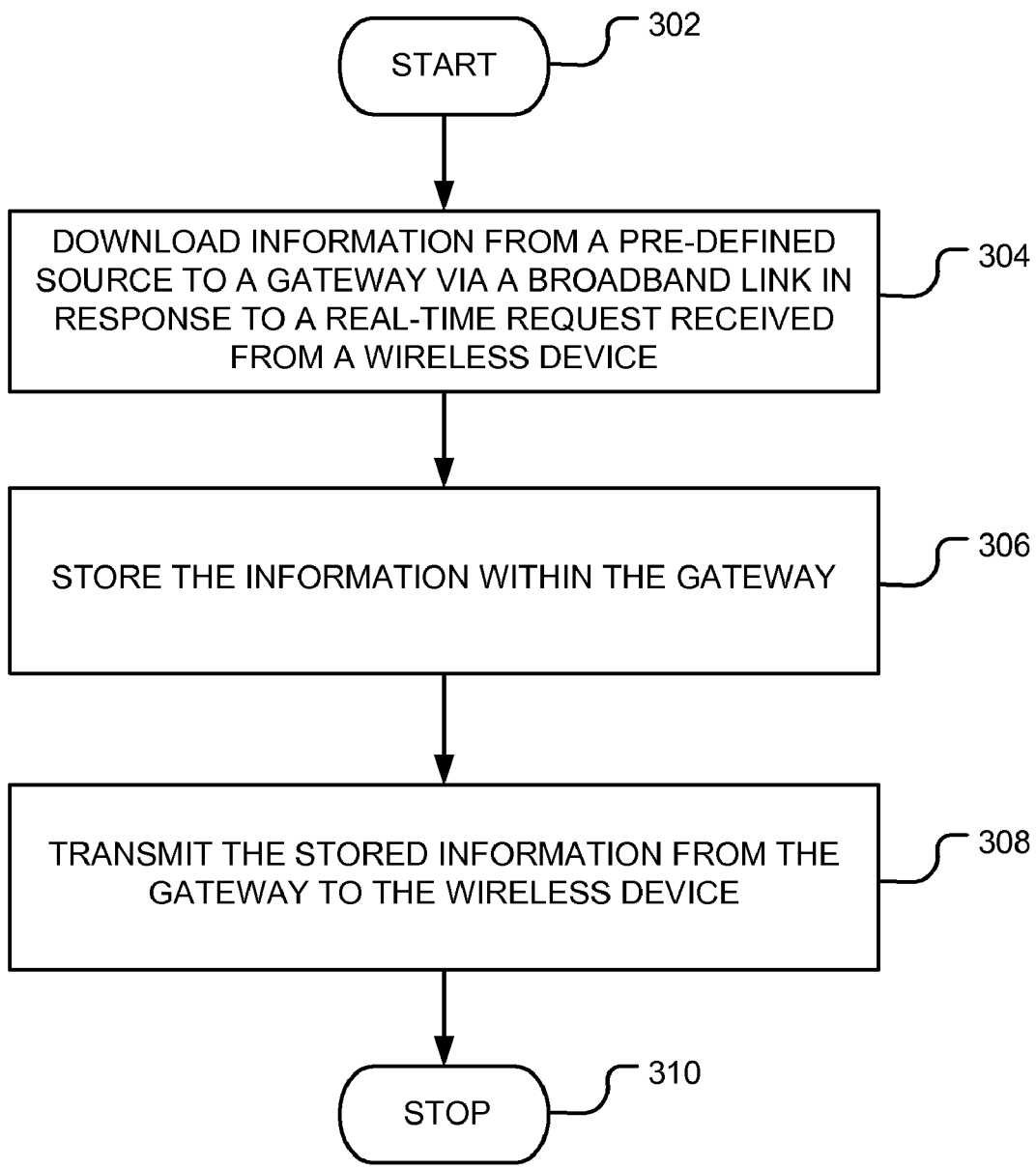
FIG. 3 is a flow diagram illustrating a method for managing information using a gateway, in accordance with one embodiment of the present invention.

FIG. 3 is a flow diagram illustrating a method for managing information using a gateway, in accordance with one embodiment of the present invention. The following method will be explained with reference to FIG. 1 and FIG. 2. However, it will be apparent to a person skilled in the art that the following method can be implemented by using any other system. The method for managing the information is initiated at step 302. At step 304, the information is downloaded to gateway 130 from the pre-defined source 150 via a broadband link 135 in response to a real-time request received from a wireless device 110, 115.

At step 306, the downloaded information is stored within the gateway 130. At step 308, the stored information is transmitted from the gateway 130 to the wireless device 110, 115. The stored information may be transmitted via a wired or wireless connection. Thereafter, the method terminates at step 310.

Figure 4:
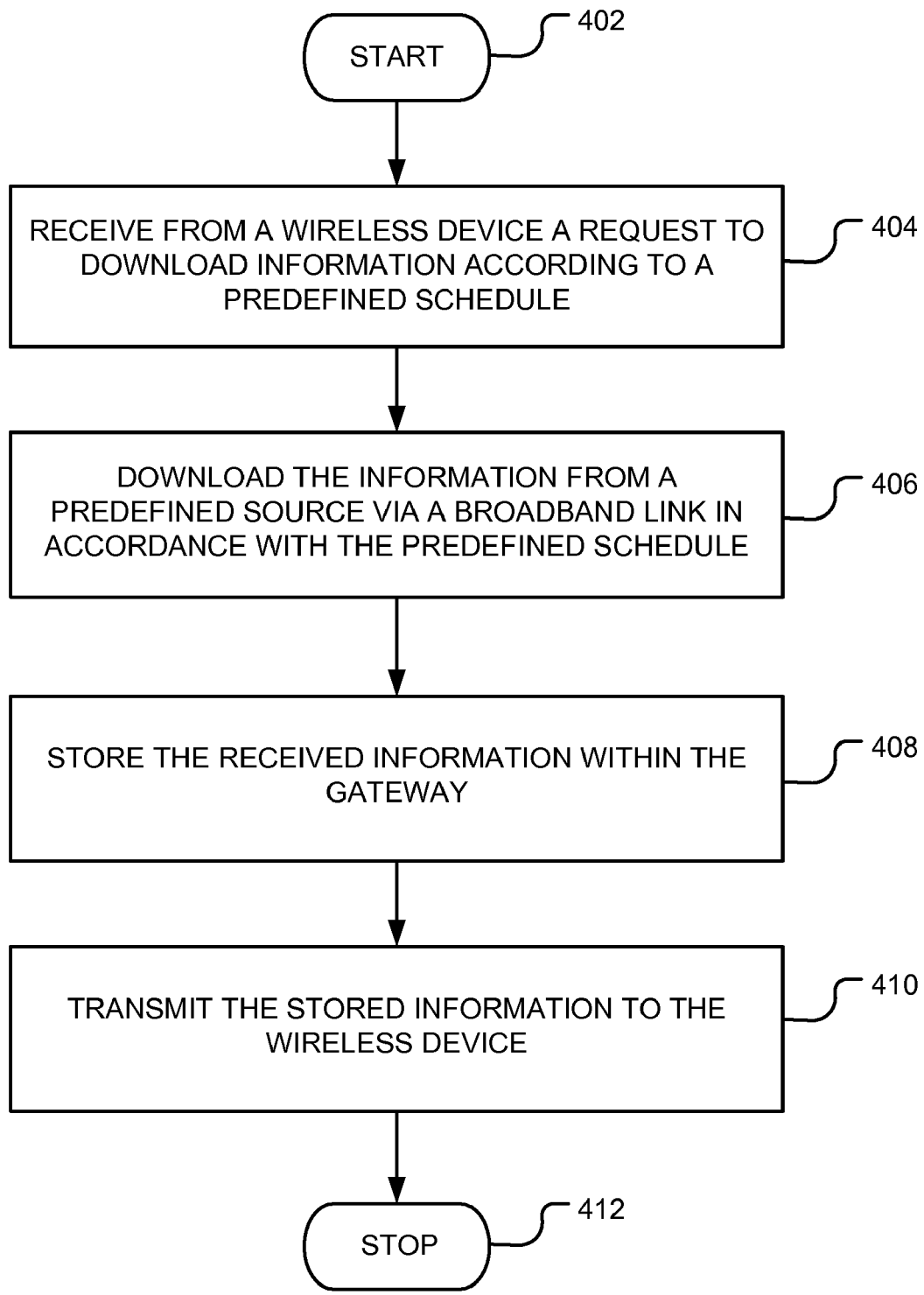
FIG. 4 is a flow diagram illustrating a method for managing information using a gateway, in accordance with one embodiment of the present invention.

FIG. 4 is a flow diagram illustrating a method for managing information using a gateway, in accordance with another embodiment. The method for managing the information is explained in conjunction with FIG. 1 and FIG. 2. However, it will be apparent to a person skilled in the art that the following method can be implemented by using any other system.

The method for managing information initiates at step 402. At step 404, a request to download information according to a predefined schedule is received from a wireless device 110, 115. For example, a request for a weather forecast can be received from the wireless device 110, 115 at gateway 130. One or more wireless devices 110, 115, may also send a request for information on traffic updates or sports updates to gateway 130. These requests for information may be received by gateway 130 via a wired or wireless link. Examples of the wireless link include, but are not limited to, a Bluetooth™ link, an infra red link, a Wireless Fidelity Network (Wi-Fi) link, and the IEEE 802.11 link.

At step 406, the information from the predefined source 150 is downloaded to gateway 130 via a broadband link in accordance with the predefined schedule. At step 408, the information downloaded at step 406 is stored in gateway 130. At step 410, the stored information is transmitted to the wireless device 110, 115. The stored information is transmitted to wireless device 110, 115 via a wired or wireless connection. Thereafter, the method terminates at step 412.

In one embodiment, the stored information can be transmitted to wireless device 110, 115 after determining that the wireless device has established a wireless link with gateway 130. For example, consider a scenario, when, after storing the received information, wireless device 110, 115 goes out of range of the wireless link between wireless device 110, 115 and gateway 130. In this example, gateway 130 will detect wireless device, 110, 115 when wireless device 110, 115 comes within range of the wireless link, and thereafter, transmit the stored information to the wireless device 110, 115.

In another embodiment, the gateway 130 can be programmed to receive and transmit the information at scheduled times. For example, a user of wireless device, 110, 115 can schedule gateway 130 to receive weather forecast at a pre-defined time of the day, such as during the night hours when gateway 130 does not receive a television broadcast or is relatively free. During this relatively free time, gateway 130 can receive the requested information from the pre-defined source 150. The received information can be stored in the memory of gateway 130. Further, gateway 130 can be scheduled to transmit the stored information to wireless device, 110, 115 at a particular time of day, for example, in the morning hours. Alternatively, the user can browse the stored information by using wireless device, 110, 115.

Various embodiments of the present invention offer one or more advantages. The present invention provides a method and system for managing information within a network that includes a primary information appliance and at least one secondary information appliance. The information can be sent and received by the primary information appliance to the network through a cable network or a broadband link. As a result, sending and receiving the information is much cheaper, as compared to transmitting information by using a mobile communication network through a point-to-point cell link. Further, the primary information appliance transmits the information to the secondary information appliance through a wireless network such as a Bluetooth™ link, which is free and therefore saves on the communication cost. Moreover, this method allows a user to schedule download and delivery of information from a pre-defined source. Consequently, it is convenient for the user to browse the downloaded information.

Figure 5:
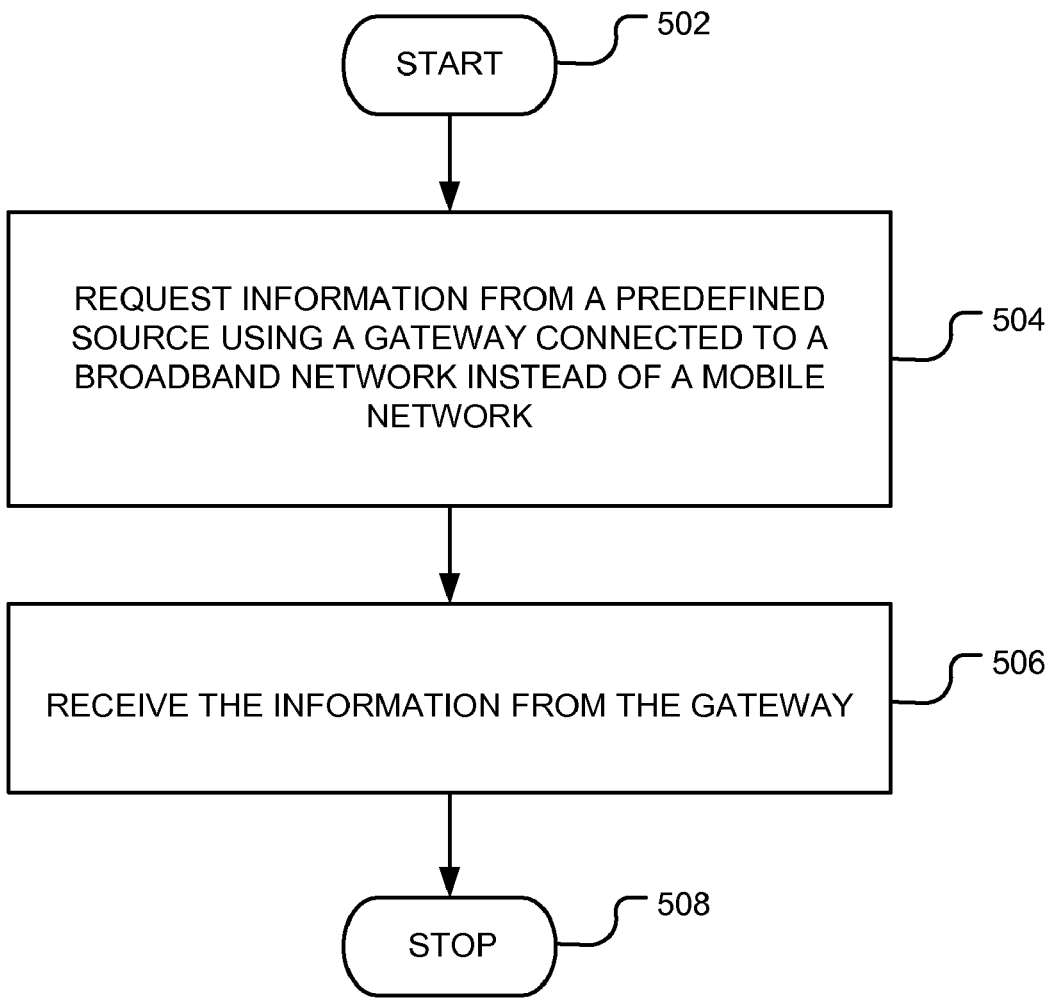
FIG. 5 is a flow diagram illustrating a method for managing information using a gateway, in accordance with another embodiment of the present invention.

FIG. 5 is a flow diagram illustrating a method for managing information using a gateway, in accordance with another embodiment. The method for managing the information is explained in conjunction with FIG. 1 and FIG. 2. However, it will be apparent to a person skilled in the art that the following method can be implemented by using any other system.

The method for managing information using a gateway initiates at step 502. At step 504, information from a pre-defined source is requested using a gateway connected to a broadband network instead of a mobile network. At step 506 the information is received from the gateway. Using system 100, a wireless device 110, 115, e.g., a mobile telephone may download information using the broadband network instead of the mobile telephone network. Downloading information via a broadband link instead of the mobile telephone network provides cost and download speed benefits to a user of the electronic device.

It will be appreciated that the method and system for managing information within a network described herein may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method to enable users to view a broadcasted media stream differently. Alternatively, some or all the functions could be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one of ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one of ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method for managing information using a gateway, comprising:
   downloading information from a pre-defined source, at a first pre-defined time, via a broadband link in response to a request received from a wireless device;
   storing the information within the gateway; and
   transmitting the stored information from the gateway to the wireless device at a second pre-defined time after the first pre-defined time;
   wherein the first pre-defined time is a time at which the gateway is relatively free of activity in comparison to the second pre-defined time.

2. The method as recited in claim 1 further wherein the gateway comprises a cable network set-top box.

3. The method as recited in claim 1 further wherein the wireless device comprises a personal digital assistant.

4. The method as recited in claim 1 further wherein the wireless device comprises a mobile telephone.

5. The method as recited in claim 1 further wherein the stored information is transmitted via a wireless link.

6. The method as recited in claim 5, wherein the wireless link comprises a Bluetooth link.

7. The method as recited in claim 5, wherein the wireless link comprises an infrared link.

8. The method as recited in claim 5, wherein the wireless link comprises an IEEE 802.11 link.

9. The method as recited in claim 5, wherein the downloaded information is transmitted to the wireless device in response to detecting that the wireless device has established the wireless link with the gateway.

10. An apparatus for managing information using a gateway, comprising:
    means for downloading information, at a first pre-defined time, from a pre-defined source via a broadband link in response to a request received from a wireless device;
    means for storing the information within the gateway; and
    means for transmitting the stored information from the gateway to the wireless device at a second pre-defined time after the first pre-defined time;

wherein the first pre-defined time is a time at which the gateway is relatively free of activity in comparison to the second pre-defined time.

11. A method for managing information using a gateway, comprising:
- receiving from a wireless device a request to download information according to a predefined schedule that specifies at least a first pre-defined time;
- downloading the information from a predefined source via a broadband link in accordance with the predefined schedule;
- storing the information within the gateway;
- transmitting the stored information to the wireless device at a second pre-defined time after the first pre-defined time;
- wherein the first pre-defined time is a time at which the gateway is relatively free of activity in comparison to the second pre-defined time.

12. A method for managing information using a gateway, comprising:
- in a wireless device, requesting information from a pre-defined source using a gateway connected to a broadband network, the information for retrieval by the gateway at a first pre-defined time via the broadband network instead of a mobile network, wherein the information is stored within the gateway;
- receiving the information from the gateway at a second pre-defined time after the first pre-defined time; and
- wherein the first pre-defined time is a time at which the gateway is relatively free of activity in comparison to the second pre-defined time.

\* \* \* \* \*